(12) United States Patent
Hou et al.

(10) Patent No.: US 6,196,637 B1
(45) Date of Patent: Mar. 6, 2001

(54) NUTCOVER AND HUBCAP LOCKING SYSTEM

(75) Inventors: Cathy Hou, Davenport, IA (US); John Zois, Chicago, IL (US)

(73) Assignee: American Chrome Chicago Company, Chicago, IL (US)

( * ) Notice: Subject to any disclaimer, the term of this patent is extended or adjusted under 35 U.S.C. 154(b) by 0 days.

(21) Appl. No.: 09/204,604

(22) Filed: Dec. 3, 1998

(51) Int. Cl.$^7$ ............................... B60B 7/14; F16B 37/14
(52) U.S. Cl. ................................. 301/37.37; 301/108.4; 411/431
(58) Field of Search .................. 301/37.1, 37.31, 301/37.37, 108.4, 108.1; 411/373, 374, 427, 429, 431, 372.5, 372.6, 377; 362/500

(56) References Cited

U.S. PATENT DOCUMENTS

| | | | |
|---|---|---|---|
| 771,740 | * 10/1904 | McKeel | 301/108.1 |
| 840,172 | * 1/1907 | Summers | 301/108.1 |
| 1,455,306 | * 5/1923 | Reilley et al. | |
| 3,548,704 | * 12/1970 | Kutryk | 411/373 |
| 3,918,762 | * 11/1975 | Hampshire | 301/37.1 |
| 4,787,681 | * 11/1988 | Wang et al. | 301/37.37 |
| 4,881,783 | * 11/1989 | Campbell | 301/108.4 |
| 5,048,898 | * 9/1991 | Russell | 301/37.37 |
| 5,082,409 | 1/1992 | Bias | 411/431 |
| 5,181,767 | * 1/1993 | Hudgins et al. | 301/37.37 |
| 5,193,884 | * 3/1993 | Sheu et al. | 301/37.37 |
| 5,380,070 | * 1/1995 | Fitzgerald | 301/37.37 |
| 5,441,334 | 8/1995 | Botterman et al. | 301/37.1 |
| 5,466,050 | 11/1995 | Botterman et al. | 301/65 |
| 5,590,992 | * 1/1997 | Russell | 411/37.37 |
| 5,707,113 | * 1/1998 | Russell | 301/37.37 |

* cited by examiner

Primary Examiner—S. Joseph Morano
Assistant Examiner—Jason R. Bellinger
(74) Attorney, Agent, or Firm—Patula & Associates P.C.

(57) ABSTRACT

A system for locking a hubcap to a wheel comprising a wheel, said wheel having a plurality of bolts extending outwardly therefrom, a hubcap cover having a plurality of holes adapted to fit over said bolts, and a plurality of nutcovers to fasten over said bolts and lock said hubcap to the wheel.

6 Claims, 7 Drawing Sheets

NUTCOVER AND HUBCAP LOCKING SYSTEM

The present invention relates to a system for locking a hubcap to a wheel and, in particular, to a system for locking a hubcap to a wheel using a plurality of nutcovers which fasten over said hubcap.

BACKGROUND OF THE INVENTION

It is well known in the automotive and, specifically, trucking industry that it is desirable to cover the wheels of the vehicle. Most truck wheels have a plurality of protruding bolts and associated nuts. The wheel is fitted over these bolts, which are long enough to extend from the axle to outside the wheel, and then secured in place by fastening nuts to said bolts. While an easy way of attaching a wheel, the protruding bolts are exposed to moisture, mud, dirt and road hazards. Furthermore, the outside of the wheel remains similarly exposed, threatening corrosion and wear to the wheel and its components, specifically the brakes and bolts that attach the wheel to the vehicle.

It is desirable, therefore, to provide for some kind of wheel covering. Wheel coverings have two functions. First, a wheel covering, especially a lustrous chrome or metallic covering, is aesthetically superior to exposed wheels. Second, a wheel covering protects the wheel and its components from the elements, especially moisture and dirt, either of which can lead to corrosion of the wheel components, brakes, nuts and screws contained therein.

In addition to providing for an adequate system for covering the wheel, it is desirable to cover the nuts and bolts that fasten the wheel to the axle and often protrude out from the wheel. The nut covering, too, serves an aesthetic and functional purpose. Aesthetically, a shiny nutcover looks superior to a rusted bolt and nut. Just as importantly, rusted or corroded nut and bolt systems are extremely difficult to screw and unscrew, making maintenance of the wheel system difficult. A nutcover that prevents moisture and corrosive elements from contacting the nut and bolt system is therefore desirable.

Finally, a system for covering both the wheel and the associated nuts and bolts is desired. Such a system would use the nutcovers and hubcap rim to secure the hubcap in place over the wheel and protecting the complete interior wheel mechanism, components included. The nutcovers should attach firmly to the nut and bolt system as well as securely locking the hubcap in place at the rim. Additionally, the system should be so secure as to avoid vibration of the parts or loss of the parts as the vehicle is being used. However, the system should overcome the problem of creating a seal around the wheel wherein heat buildup associated with the moving and braking of the wheel system can damage interior components such as oil seals.

There are several instances in the prior art of inventions seeking to address these concerns. U.S. Pat. No. 5,082,409 to Bias is for a vehicular lug nut cover and clip. In the Bias invention, the nutcover completely covers the bolt and nut system, but is secured in place via clips in the shell cavity. While inexpensive and aesthetically pleasing, the Bias nutcover is not firmly fastened to the nut and bolt, making annoying vibration and even loss of the nutcover during driving likely. Moreover, the Bias nutcover teaches no way of securing the nutcover to a hubcap.

U.S. Pat. No. 5,590,992 to Russell is a cover for a bolt and nut, similar to the Bias invention. The Russell nutcover has, instead of clips, an internally threaded portion designed to mate with a protruding bolt and screw onto and over the nut and bolt system. The internally threaded cavity is stabilized via six ribs extending radially from the exterior of the threaded portion and molded to the inner surface of the nutcover. While providing greater stability than the clips of the Bias nutcover, the ribs are least optimally aligned for resisting the torque associated with the screwing motion. Hence, the internally threaded portion is prone to deformation and displacement, causing an unclean fit between the nutcover and the bolt and nut system. Again, vibration and nutcover loss during use may result. Additionally, the Russell nutcover lacks a sufficient means for locking the nutcover to a hubcap.

U.S. Pat. No. 5,707,113 to Russell (the "113" patent) utilizes the Russell nutcover and hubcap to cover both the wheel and the nuts and bolts. The 113 patent comprises a generally dome shaped hubcap set over the center of the wheel hub, said hub cap having a plurality of notches about its periphery, with the nut and bolt system positioned in each notch. The hubcap further comprises a flange extending into each notch, upon which is fastened a nutcover. The nutcover is fastened over the nut and associated bolt and sits atop the flange, securing the hubcap to the wheel. The 113 patent further discloses a nutcover with detents and associated indentations on the flange to provide tactile and audible indications that the nutcover is properly seated upon the flange.

The 113 patent, however, has several shortcomings. First, the hubcap is secured by nutcovers that exert an inward radial force upon the hubcap. Said force necessarily implies a radial force exerted on the nutcover by the hubcap, and consequently a force on the bolts and nuts that ultimately hold the wheel in place. The presence of this radial force weakens the nut and bolt system and can result in loosening of the wheel and possibly wheel loss.

The hubcap and nutcover of the 113 patent are fastened about the periphery. Hence, should any of the nutcovers become loose from the vibration of the system or the unclean fit resulting from the radial disposition of the supports upon the threaded interior portion of the Russell nutcover, nothing would remain about the circumference hubcap. Without securing nutcovers about the hubcap, the hubcap could simply fall off. Should the hubcap fly off during use, the potential damage to roads, vehicles, and worst of all, drivers and pedestrians would be unimaginable.

The 113 patent further lacks on effective means for locking the nutcover to the hubcap. The detents on the base of the nutcover and the indentations on the hubcap flange may provide tactile and audible indications of proper assembly, but they do not interlock and allow the nutcover to be screwed in either direction. Because the detent/indentation system allows turning of the nutcover in either direction, it is an ineffective means of securing the nutcover to the hubcap.

The system of the 113 patent also creates a seal about its periphery. The heat incidental to the braking and motion of the entire wheel system has no means of dissipating, increasing the risk of wear and erosion of critical oil seals.

Finally, the nutcover of the 113 patent suffers from the disadvantages previously mentioned herein.

A need exists in the art, therefore, for a system of locking a hubcap to a wheel using nutcovers that overcome the deficiencies addressed herein.

SUMMARY OF THE INVENTION

It is an object of the present invention to provide a system to cover the wheel of a vehicle and the exposed protruding nuts and bolts used to attach the wheel to the axle. A feature of the present invention is a nutcover comprising a closed top and side walls depending downwardly therefrom to define a generally circular base, an interior surface and a means for attaching said nutcover to a bolt and nut. Another feature of the present invention is a hubcap which covers the wheel hub, said hubcap having a plurality of holes through which extend each of the attaching bolts, said hubcap locked to the wheel via nutcovers attaching to the protruding bolts and nuts. An advantage of the present invention is that the bolts and nuts that attach the wheel to the axle are protected from corrosion causing elements and dangers such as moisture, dirt, rocks and road hazards. Another advantage of the present invention is that the wheel hub is protected from the same.

Yet another object of the present invention is to provide a system for locking a hubcap to a wheel that is easy to do and reusable. A feature of the present invention is a hubcap having holes adapted to fit over protruding, wheel attaching nuts and bolts. Another feature of the present invention is a nutcover having an interior threaded portion adapted to screwably attach to the protruding bolt and having an interior surface adapted to fit over a standard vehicular mechanical nut. Another feature of the present invention is a nutcover that can be screwed on by hand. Another feature of the present invention is a nutcover having a plurality of pressure sensitive clips on its interior surface for frictionally fitting to a protruding nut and bolt system. An advantage of the present invention is that no tools are required to lock the hubcap and nutcovers. Yet another advantage of the present invention is that the parts are reusable. Yet another advantage of the present invention is that it is adapted for use with existing wheel components.

Yet another object of the present invention is to provide a system for preventing a hubcap from falling off of a wheel. A feature of the present invention is a hubcap having a plurality of holes spaced about its periphery through which extend bolts attached to the wheel, said holes having a flange, said flange having the same center but smaller radius than the hole. Another feature of the present invention is nutcovers that screw over said bolts and sit tightly atop the flange. Another feature of the invention is interlocking notches along the exterior base of the nutcover, said notches to interlock with a protrusion in the hole of the hubcap. Another feature of the invention is holes spaced about the periphery of the hubcap instead of semi- or quasi-circular notches. An advantage of the present invention is that the hubcap can be secured to the wheel without slipping off with as little as one nutcover.

A further object of the present invention is to provide strong and stable nut covers that avoid vibration and loosening while in use. A feature of the present invention is a nutcover having an interior threaded portion depending from the top of said nutcover, said threaded portion adapted to screwably mate with a threaded protruding bolt. Another feature of the present invention is a plurality of nearly tangential supports having a generally triangular shape, said supports circumscribing said threaded interior portion and attached at its vertices to said interior surface of said nutcover. Another feature of the present invention is a plurality of notches about the base of the nutcover, said notches to interlock with a protrusion on the hubcap. An advantage of the present invention is that the torque associated with screwing the nutcover upon the bolt is nearly directly opposed by the tangential support. Another advantage of the present invention is that the nutcover interlocks with the hubcap and is not easily screwed in the direction required for removal.

Yet another object of the present invention is to provide a system which dissipates heat incident to wheel function. A feature of the present invention is a small opening near the hole of the hubcap through which hot, expanding air can escape. An advantage of the present invention is that heat is allowed to escape from the system, alleviating damage to oil seals and wheel and tire components.

Another object of the present invention is to provide a means for accessing the wheel hub without complete removal of the hubcap and nutcover system. A feature of the present invention is a detachable plate in the center of the hubcap. An advantage of the present invention is that the wheel hub is more easily accessible for repair and maintenance.

In brief, the present invention is a system for locking a hubcap to a wheel comprising a wheel, said wheel having a plurality of bolts extending outwardly therefrom; a hubcap having a plurality of holes adapted to fit over said bolts; a means for locking said hubcap to said wheel, such as a nutcover having an interior surface and a threaded interior portion of said nutcover adapted to screwably attach to said bolt; in the nutcover, a plurality of nearly tangential supports having a generally triangular shape, said supports circumscribing said threaded interior portion and attached at its vertices to said interior surface of said nutcover to reduce the stress on said threaded interior portion; a means for dissipating heat, such as an opening near the base of said nut cover for dissipating heat; a plurality of notches at the base of said nutcover and a protrusion at the base of the holes of said hubcap cover to interlock with said notches; reflectors on said nutcovers for visually enhancing said system.

Numerous other advantages and features of the invention will become readily apparent from the detailed description of the preferred embodiment of the invention, from the claims and from the accompanying drawings in which like numerals are employed to designate like parts throughout the same.

BRIEF DESCRIPTION OF THE DRAWING

A fuller understanding of the foregoing may be had by reference to the accompanying drawings wherein.

DETAILED DESCRIPTION OF THE PREFERRED EMBODIMENTS OF THE PRESENT INVENTION

Figure 1:
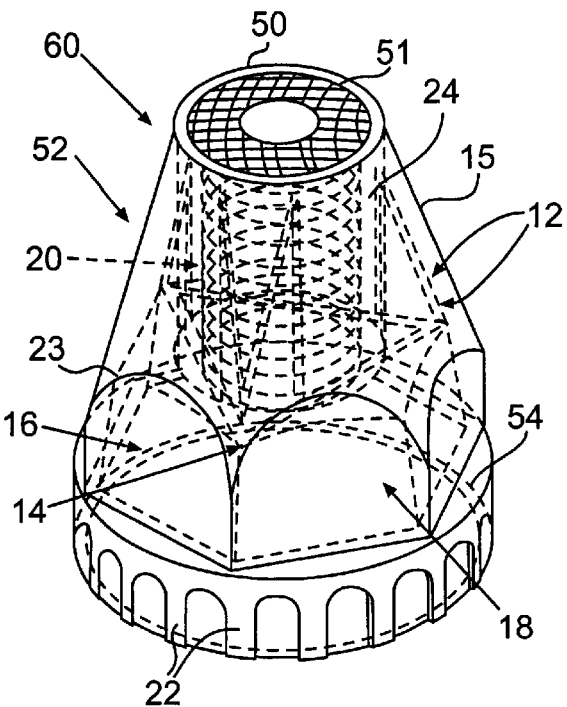
FIG. 1 is a perspective view of a nutcover for locking the hubcap to the wheel showing the interior of the same.

While the invention is susceptible of embodiment in many different forms, there is shown in the drawings and will be described herein in detail preferred and alternate embodiments of the present invention. It should be understood, however, that the present disclosure is to be considered an exemplification of the principles of the invention and is not intended to limit the spirit and scope of the invention and/or claims of the embodiment illustrated.

Figure 8:
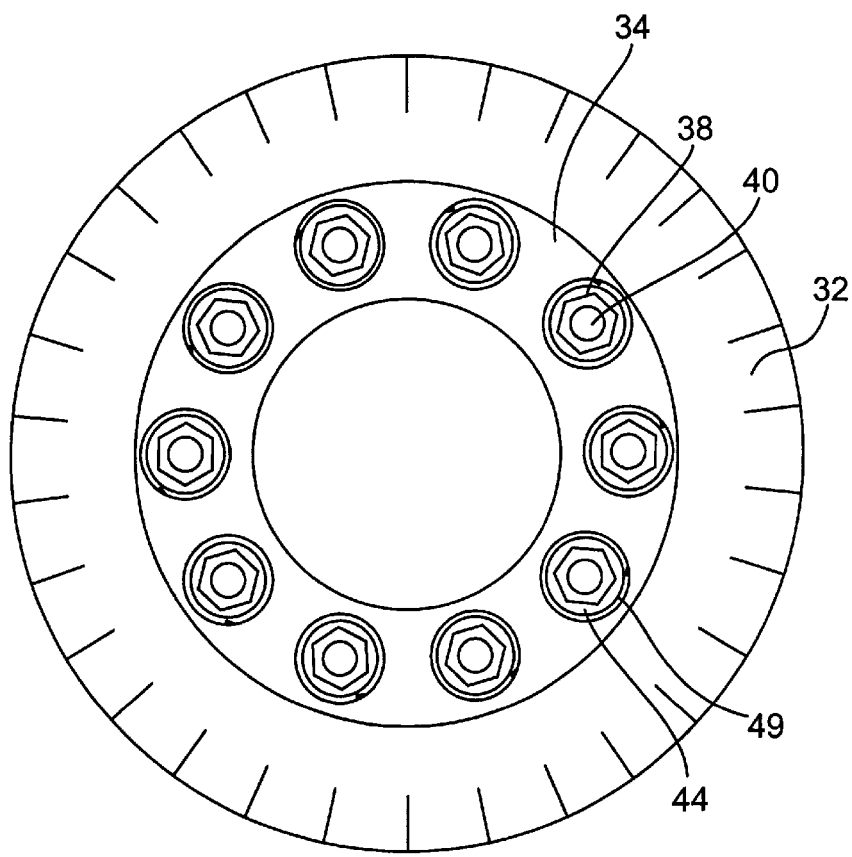
FIG. 8 is a front elevated view of the hubcap placed on a wheel.

The present invention is a system for locking a hubcap to a wheel comprising a wheel, said wheel having a plurality of bolts extending outwardly therefrom; a hubcap cover having a plurality of holes adapted to fit over said bolts; and a means for locking said hubcap cover to said wheel. FIG. 8 illustrates the present hubcap 34 placed over the hub of the wheel 32. Said hubcap 34 has a plurality of holes 44. The wheel 32 is fastened to the vehicle via bolts 40 and nuts 38 that screw on over said bolt 40. The holes 44 of the hubcap 34 are adapted to fit over the bolts 40 and nuts 38 such that each bolt 40 has an associated hole 44. The hole 44 further has a flange 49 extending into said hole 44, said flange 49 having the same center as the hole 44 but a smaller radius. Said flange 49 provides a base of support for the nutcover 60.

Figure 6:
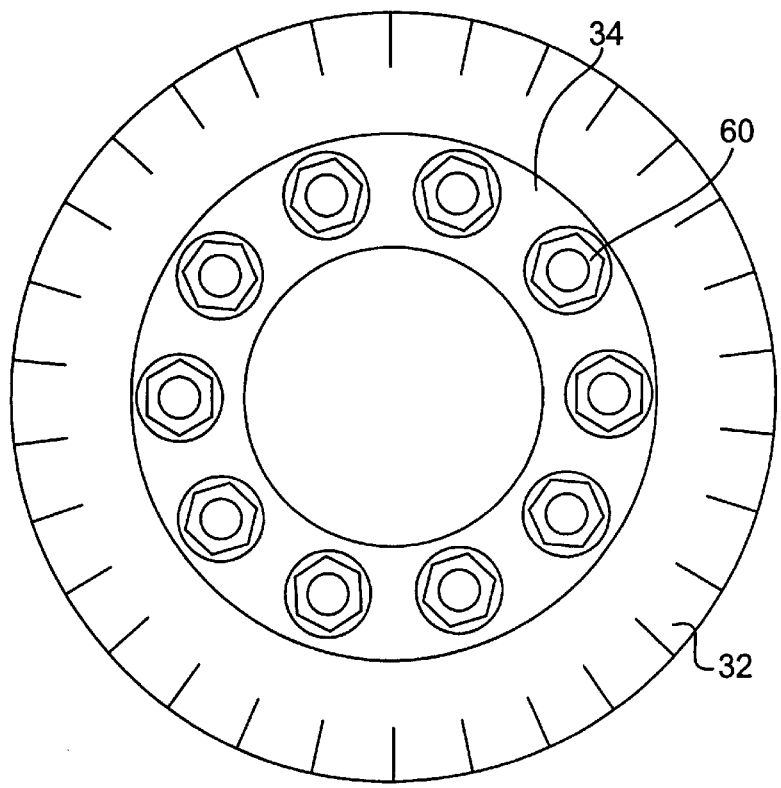
FIG. 6 is a front elevated view of the hubcap and nutcover of the present invention in use.

FIG. 6 illustrates the hubcap 34 locked to the wheel 32 with locking means, said locking means being a nutcover 60 which attaches to the bolt and nut (not shown) and rests atop the flange (not shown). A nutcover 60 is imposed over each bolt and nut firmly against the flange (not shown) in each hole (not shown) of the hubcap 34, locking the hubcap 34 to the wheel.

FIG. 1 illustrates the preferred locking means, a nut and bolt cover 60. Said nutcover 60 has a closed top 50 and sides 52 depending downwardly and outwardly therefrom to a circular base 54. Sides 52 have an outer and interior surface 15, 16 respectively. Said outer surface 15 extends outwardly and downwardly therefrom to form an circular base 54. The outer surface 16 is further defined by a lower portion shaped as a hexagon, the shape of a standard mechanical nut. The nutcover 60 has an interior 18 defined by an interior surface 16 having a hexagonal shape so as to fit over a mechanical nut. The interior planar angles of the hexagonal interior surface 16 of the nutcover 60 define vertices 23 discussed herein below. The interior 18 of the nutcover 60 contains a threaded portion 20 depending downwardly from the top 50. Said threaded portion 20 corresponds to an exterior threaded surface of the bolt 40, said complementary threaded portions providing a means for locking said nutcover 60 to said bolt 40 (Figures). The circular base 54 of the nutcover 60 contains a plurality of notches 22 on its exterior for interlocking with a protrusion on the hubcap, providing yet another mechanism for locking said nutcover 60 in place, best illustrated in FIG. 5. The nutcover 60 can be made from any suitable material that is durable and resists corrosion such as aluminum, plastic that has been chrome plated, general purpose polystyrene, high impact polystyrene, acrylonitrile butadiene styrene terpolymer, acrylonitrile styrene copolymer, or polymethyl methacrylate. Said nutcover may also include a means for visually enhancing said system, such means including but not limited to a reflector 51 affixed to the top 50 of the nutcover 60.

Figure 2:
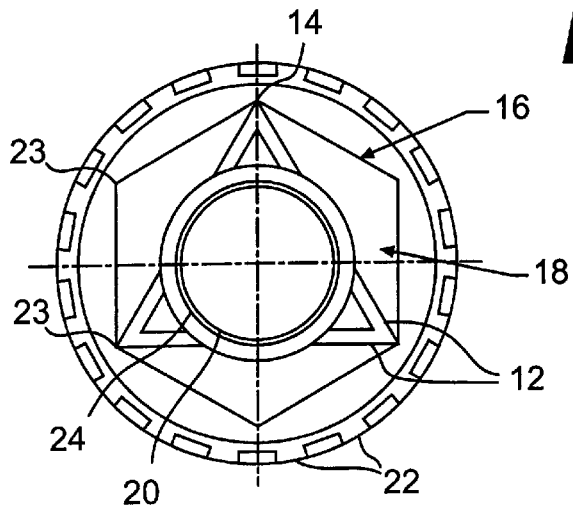
FIG. 2 is an bottom view of the interior the nutcover of FIG. 1.

FIG. 2 illustrates the interior 18 of said nutcover 60. The interior, designated generally as numeral 18, has an interior surface 16, said surface having a shape adapted to fit over a standard mechanical nut. The preferred embodiment has an interior surface 16 with a hexagonal contour to fit a standard mechanical nut. The hexagonal interior surface 16 is further defined by six vertices 23. The interior 18 also has, depending from the top of said nutcover 60 a means for attaching the nutcover 60 to a bolt. Said means may be a threaded interior portion 20, said portion having a threaded interior 24 adapted to screwably attach to a bolt.

Figure 2A:
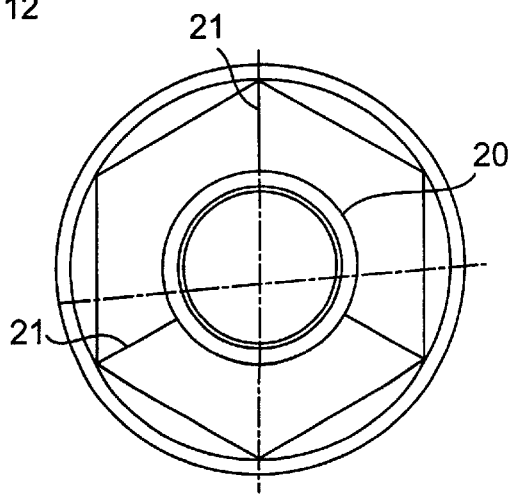
FIG. 2a is a bottom view of the nutcover of the prior art.

Said threaded portion 20 must be stabilized within the center of the nutcover 60. Moreover, as said nutcover 60 is screwed over a bolt, the torque and stress exerted by the tightening of said nutcover 60 can deform or displace the threaded interior portion 20. In FIG. 2a the conventional stabilizing means of the prior art is radial supports 21 extending outwardly from the circumference of the threaded interior portion 20. However, the same torques that act to deform and displace the center threaded interior portion 20 also act strongly upon radial supports 21.

Figure 2B:
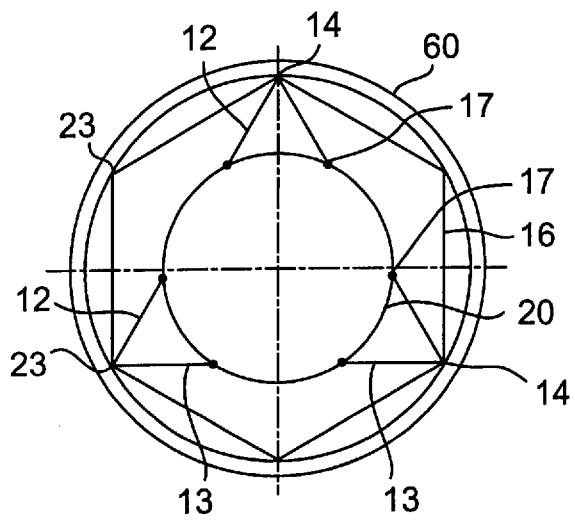
FIG. 2b is an enlarged bottom view of the nutcover of FIGS. 1 and 2 showing the stabilizing means.

The preferred embodiment of the present invention, illustrated in FIG. 2 and FIG. 2b, with like numbers representing like parts, therefore, utilizes a plurality of nearly tangential supports 12 having a generally triangular shape, said supports 12 circumscribing the threaded interior portion 20 and attached at its vertices 14 to the interior surface 16 of said nutcover 60. In FIG. 2b, said supports 12 contact the threaded interior portion 20 at six points 17 such that collinear segments 13 of said supports 12 are nearly tangent to said interior threaded portion 20. Said supports further have vertices 14 attached to the interior surface 16 of said cover 60 at alternating vertices 23 of the hexagonal interior surface 16. The present embodiment provides greater stabilization for the threaded interior portion 20 by providing support in nearly direct opposition to the torque exerted during the screwing action.

Figure 3:
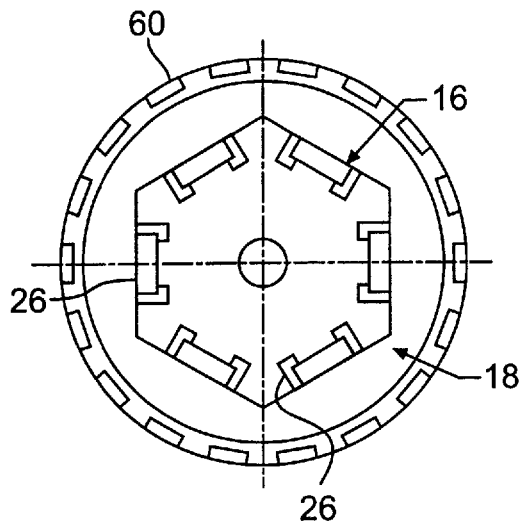
FIG. 3 is a bottom view of a nutcover showing an alternate attachment means.

FIG. 3 illustrates an alternate means for attaching the nutcover to the bolt, namely a plurality of pressure sensitive clips 26. The interior 18 of the nutcover 60 has an interior surface 16 adapted to fit over a standard mechanical nut. In the present embodiment, said interior surface 16 is hexagonal as such shape adapts to most any standard mechanical nut. The sides of the hexagonal interior surface 16 have pressure sensitive clips 26, said clips supplying a radial force creating a frictional fit between the clips 26 and the nut. The alternate embodiment may function with as few as three clips 26 imposed upon alternating sides of the hexagonal interior surface 16, but functions best with six clips 26, i.e., one for each of the sides of the hexagonal interior surface 16.

Figure 4:
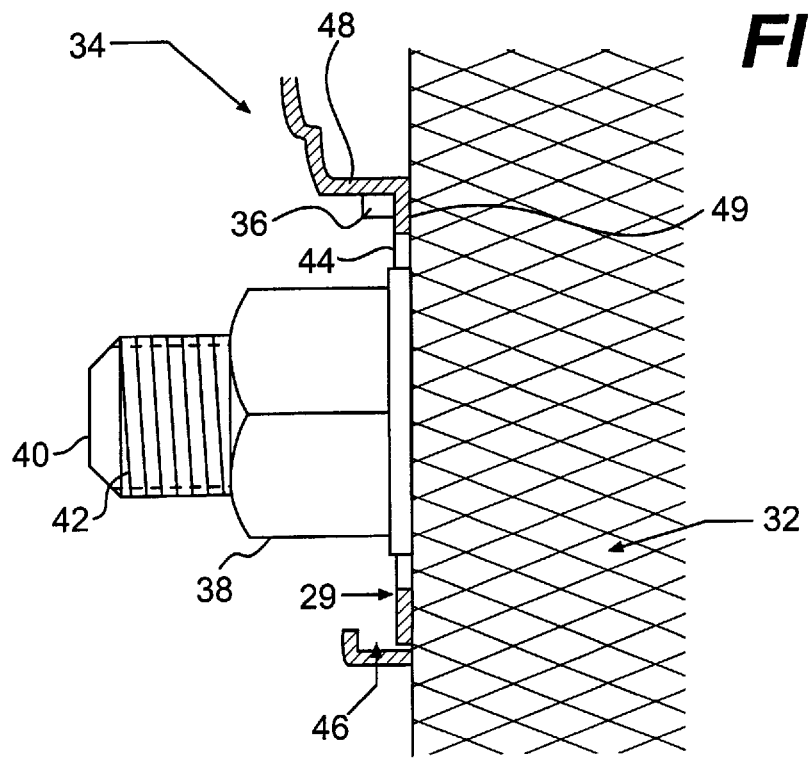
FIG. 4 is an enlarged cross-sectional view of a portion of the wheel and hubcap displaying a single protruding bolt and nut.
Figure 5:
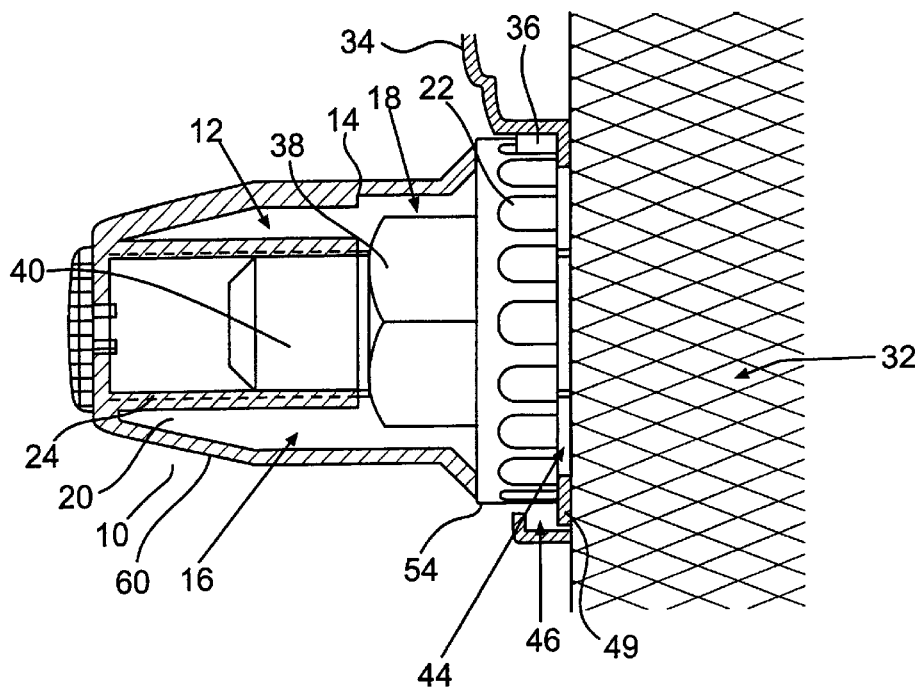
FIG. 5 is an enlarged cross-sectional view of a portion of the wheel, hubcap and nutcover in use on a single protruding bolt and nut.

FIGS. 4 and 5 illustrate the wheel, hubcap and locking means in use. FIG. 4 illustrates the cross-sectional view of the hubcap assembly on a wheel. The wheel 32 has a bolt 40 extending outwardly therefrom, said bolt 40 secured at the base nearest the wheel by a nut 38. Said bolt 40 is threaded 42 to screwably attach to said nut 38. The interior threaded portion 20 of the nutcover 60 screwably attaches to said bolt 40. FIG. 4 further illustrates the hubcap 34, said hubcap 34 having a hole 44 adapted to fit over the bolt 40 and nut 38 configuration. The hubcap should be of a suitable material that is both durable and resists corrosion. Such materials include but are not limited to aluminum, chrome-plated plastic, general purpose polystyrene, high impact polystyrene, acrylonitrile butadiene styrene terpolymer, acrylonitrile styrene copolymer, or polymethyl methacrylate. The hole 44 has walls 48 about its circumference extending upwardly and outwardly, perpendicular to the plane of the wheel 32 to which the hubcap 34 is to be locked. Upon the wall 48 is one means of locking the hubcap 34 to the wheel 32, specifically a single protrusion 36 extending into the hole 44 to interlock with the notches 22 of the nutcover as said cover is screwed onto the bolt 40, best illustrated in FIG. 5. The hole 44 has extending towards its center, a flange 49 atop which sits the nutcover 60, as illustrated in FIG. 5. Said flange 49 has the same center as the hole 44 but a smaller radius. The flange 49 directly touches the wheel 32 and provides a base upon which the locking means, such as the nutcover 60 may sit. The system also comprises a means for dissipating heat that builds up throughout the tire system as the tires and brakes constantly stop and start the vehicle. In the present embodiment, the wall 48 also has said heat dissipating means, namely an opening 46 to allow expanding hot air to exit the system, reducing the heat beneath the hubcap 34 and throughout the tire system.

Figure 7:
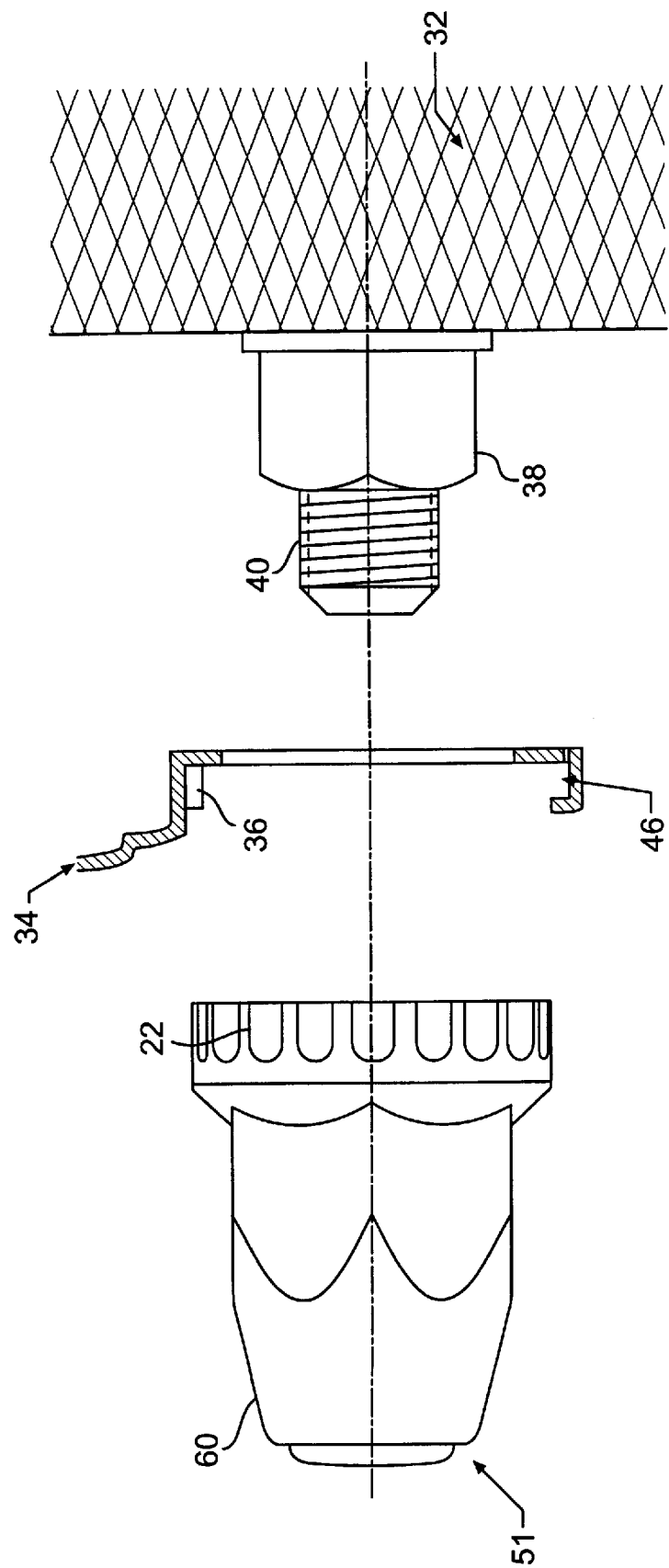
FIG. 7 is an exploded, enlarged partial cross sectional view of the hubcap, wheel and locking means.
Figure 11:
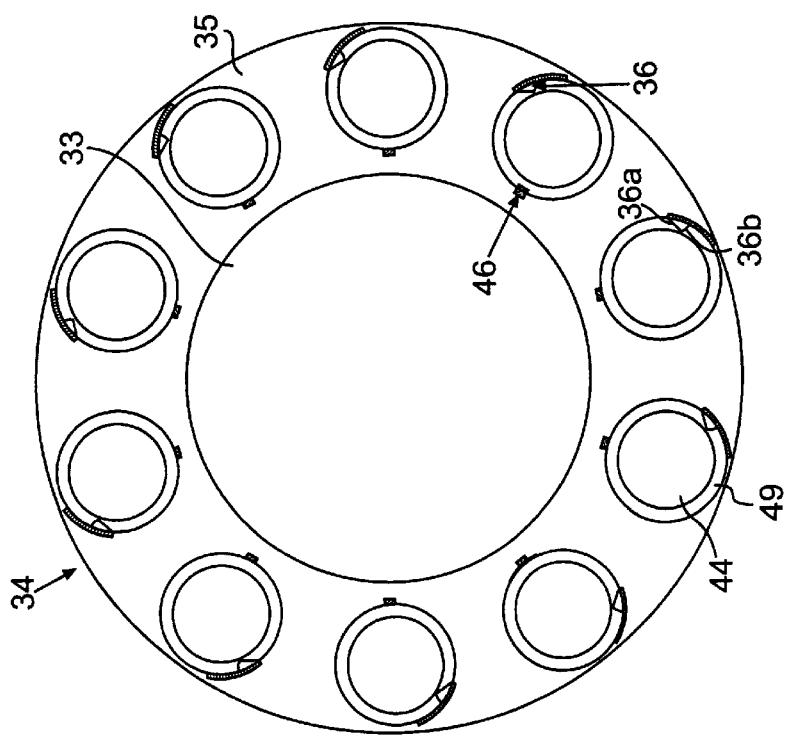
FIG. 11 is an overhead view of the hubcap of the present invention.
Figure 12:
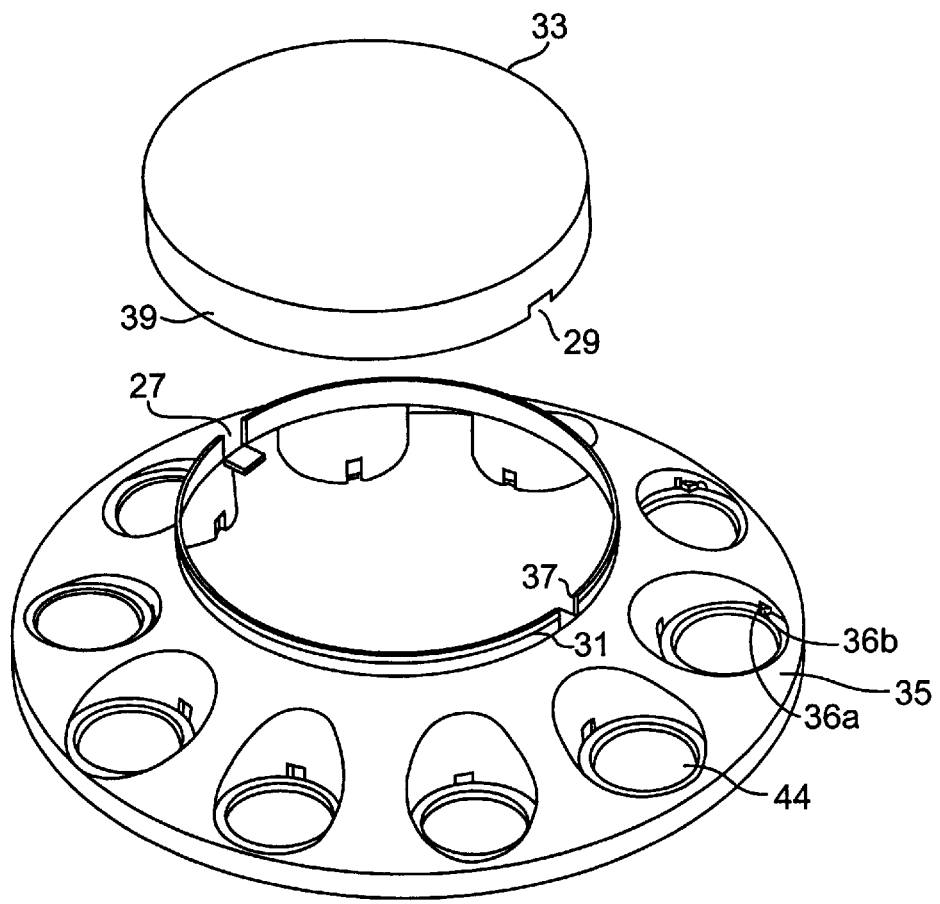
FIG. 12 is a perspective view of the hubcap of the present invention with detachable center portion.

FIGS. 5 and 7 illustrate the hubcap and nutcover locking system together. FIG. 5 illustrates a cross-sectional view of the hubcap and locking means on a wheel, while FIG. 7 is an exploded view of the same, with like numerals representing like parts throughout. The wheel 32 has a bolt 40 extending outwardly therefrom with a nut 38 at the base of the bolt 40 nearest the wheel 32. Over said bolt 40 and nut 38 conjunction is placed the hubcap 34, said hubcap having a hole 44 through which fits the bolt 40 and nut 38 conjunction. The means for locking said hubcap 34 to said wheel 32 is a nutcover 60, said nutcover 60 is screwed onto the bolt 40 and over the nut 38 such that the base 54 of the nutcover 60 fastens snugly atop the flange 49 of the hubcap 34. In said nutcover 60, the means for attaching the nutcover 60 to the bolt 40 is an interior threaded portion 20 (FIG. 5) adapted to screwably attach to said bolt 40. As the nutcover 60 is screwed over the bolt 40 and nut 38, the notches 22 at the base 54 of the nutcover 60 interlock with the protrusion 36 in the wall 48 of the hole 44 of the hubcap 34. The interlocking notches 22 and protrusion 36 allow for easy fastening in the direction for attaching said nutcover 60, but retard turning oppositely, making removal of the nutcover 60 difficult. Specifically, as best seen in FIGS. 11 and 12, protrusion 36 is triangular in shape and defines a first sloping side 36a and a second sloping side 36b. As can be seen, side 36a has a gradual slope, while side 36b has a more severe slope. Thus, as the nutcover 60 is tightened, the sides of notches 22 ride relatively easily over side 36a. However, when nutcover 60 is loosened, a much greater force is required to move the sides of notches 22 over the more severely sloped side 36b. "Preferably, protrusion 36 is detached from hubcap 34 along two or three edges, to allow the protrusion 36 to slightly deform during tightening or loosening. This is achieved by forming notches or cuts 47 around the edges of the protrusion as shown in FIGS. 11 and 12." Hence, the notches 22 and protrusion 36 provide yet another means for locking the hubcap 34 to the wheel 32 by locking the nutcover 60 in place over the flange 49 of the hole 44 of the hubcap 34 firmly against the wheel 32. The present system further comprises a means for dissipating heat. In the preferred embodiment, said heat dissipating means is a hole 46 in the wall 48 of the hole 44 of the hubcap 34 to allow expanding hot air that would otherwise be trapped beneath the hubcap 34, damaging the oils seals and integrity of the entire tire system, to escape. Said system may also include a means for visually enhancing said system, such as but not limited to reflectors 51 affixed to the top 50 of said nutcover 60.

Figure 9:
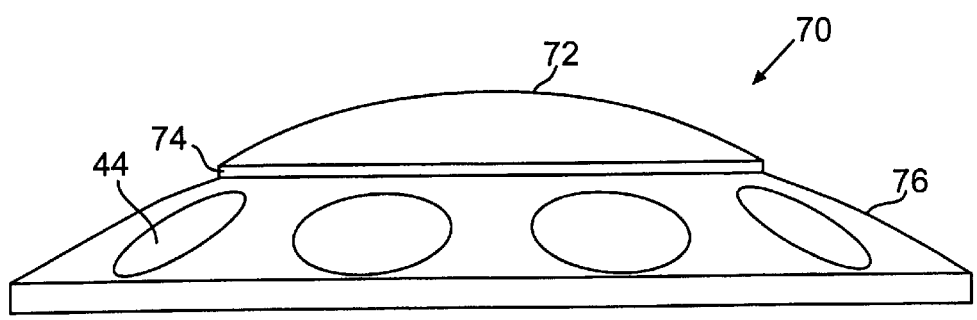
FIG. 9 is an elevated side view of the hubcap of the present invention.

Trucks that make use of the present invention often have structurally different front and rear wheels. Front wheels usually have a generally flat hub that is coplanar with the outer surface of the wheels. Rear wheels often have a generally concave hub with the axle extending out from the concave interior. Hence, the present invention uses different hubcaps adapted for each particular type of hub. FIG. 9 demonstrates a hubcap of another embodiment for a wheel with a flat hub. The hubcap, designated generally as numeral 70, has a dome shaped center portion 72, said portion having a circumference adapted to cover the hub of a wheel. Although the embodiment shown demonstrates a generally dome shape, the center portion could be flat or have some non-uniform surface, especially to allow a manufacturer to mold markings or decorations onto the same. Around the center portion 72 is a wall 74 extending from the circumference of the center portion 72 and perpendicular to the outer surface of the wheel. From the edge of the wall 74 closest to the wheel extends a periphery 76, said periphery extending uniformly away from the center portion 72 and towards the wheel, thus having an inner circumference equal to that of the center portion 72 and outer circumference equal to that of the hub of the wheel. Evenly spaced about the periphery 76 are holes 44, said holes adapted to fit over bolts and associated nuts extending from the wheel of the vehicle over which the hubcap is placed.

Figure 10:
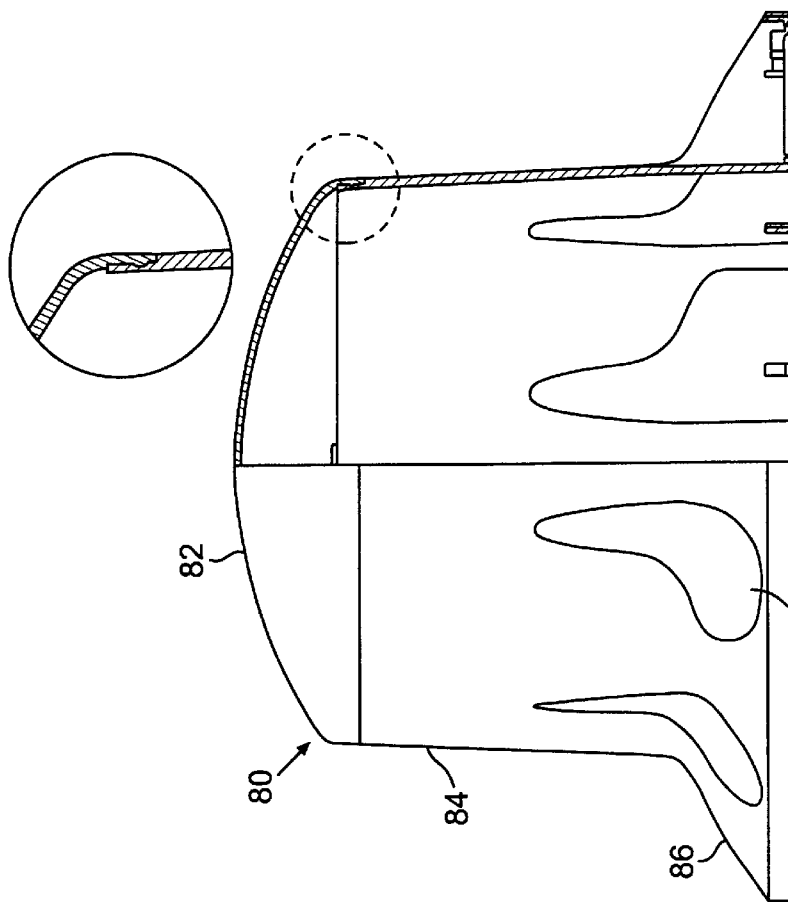
FIG. 10 is a partial cross-section elevated side view of the hubcap of the present invention for use on a wheel with a generally concave hub and extending axle.

FIG. 10 demonstrates a hubcap of another embodiment of the present invention for use on a wheel with a concave hub and extending axle. The hubcap, designated generally as numeral 80, has a generally dome shaped center portion 82, said center portion having a circumference adapted to cover the center portion of the hub of the wheel. The center portion 82 need not necessarily be dome shaped, however, as a flat or non-uniform surface could also be functional. Extending out from the circumference of the center portion 82 is a circular wall 84, said wall having a nearly uniform circumference all along its length and extending from the center portion 82 nearly perpendicular to the wheel over which the hubcap 80 is to be placed. The wall 84 should extend far enough to completely enclose the axle portion extending out from the wheel hub. About the end of the wall 84 closest to the wheel is a periphery 86, said periphery extending uniformly away from the wall 84 and toward the wheel, thus having an inner circumference nearly equal to that of the center portion 82 and outer circumference equal to the hub of the wheel over which the hubcap 80 is to be placed. Evenly spaced about the periphery are holes 44, said holes adapted to fit over a bolt and associated nut extending out from the wheel over which the hubcap 80 is to be placed.

FIG. 11 shows an overhead view of either the hubcap of FIG. 9 or the hubcap of FIG. 10. The hubcap 34 has a circular, center portion 33 adapted to fit over the center portion of the hub of a wheel. Extending around the center portion 33 is a periphery 35, said periphery having an inner circumference equal to that of the center portion 33 and outer circumference equal to the hub of the wheel over which the hubcap is to be place. Evenly spaced about the periphery are holes 44, said holes adapted to fit over the bolt and associated nut extending out from the wheel over which the hubcap is to be placed. Each hole 44 has a flange 49, said flange extending into the hole 44 and having the same center but smaller radius than the hole 44. Into the hole 44 is a protrusion 36, said protrusion to interlock with the notches of the nutcover (not shown) and retard the unscrewing of the nutcover (as described above). Embedded in the hole 44 is a small opening 46, said opening to allow hot, expanding air to dissipate from the wheel system as the vehicle is in use.

Figure 13:
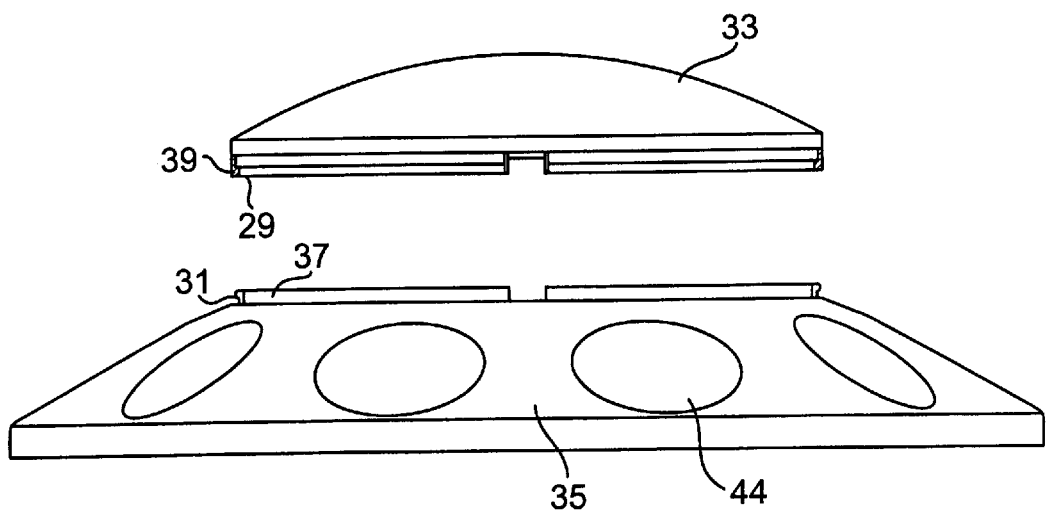
FIG. 13 is an elevated exploded side view of the hubcap of the present invention with detachable center portion.

The present invention further comprises a means for accessing said wheel while the nutcover and hubcap locking system is in place. FIGS. 12 and 13 demonstrate one such accessing means, namely a detachable center plate on the hubcap. Said accessing means is available to either the front or rear wheel hub cap. The center portion 33 of the hubcap 34 has a wall 39 about the circumference of the center portion 33, said wall extending towards the wheel when said hubcap 34 is in place and having a uniform circumference all about and at all times equal to the circumference of the center portion 33. Evenly spaced around the wall 39 are protrusions 29, said protrusions extending towards the center of the center portion 33. The present embodiment illustrates four such protrusions 29, but said accessing means could function with as few as one and as many as might be desired. The periphery 35 of the hubcap 34 has along its inner circumference a wall 37 extending out from said inner circumference perpendicular to the wheel upon which the hubcap 34 is to be placed. The periphery wall 37 has an overhanging area 31 all along its length, said area 31 extending towards the outer circumference of the periphery 35 and parallel to the wheel upon which the hubcap 34 is to be placed. Evenly spaced about the periphery wall 37 are openings 27, preferably but not necessarily one opening 27 for each protrusion 29 of the center portion 33. The detachable center portion 33 is reversibly attached by placing the center portion 33 over the periphery 35 so that the protrusion 29 in the center portion 33 is aligned with the opening 27 of the periphery wall 37. The center portion 33 is then turned so that the protrusion 29 is firmly under the overhang area 31, hence locking the center portion 33 in place. The overhang area 31 or periphery wall 37 may have stoppers to prevent the center portion 33 from being rotated too far or for securing said center portion 33 in place.

Other accessing means could include a threaded center portion wall and oppositely threaded periphery wall to allow the center portion to be screwed into place, clips to snap the center portion in place, or removable pegs that slide through openings in the center portion and periphery walls.

What is claimed is:

1. A hubcap system for covering the hub of a wheel and associated bolts and nuts, said system comprising:

a hubcap adapted to cover said hub of said wheel, and having a plurality of holes adapted to fit around said bolts and nuts;

a plurality of nutcovers adapted to insert into said plurality of holes, attach to said bolts, and cover said nuts, and hold said hubcap to said wheel;

said plurality of holes are defined by sidewalls, said sidewalls having a flange extending generally perpendicularly from said sidewall towards said bolts and nuts, said nutcover adapted to engage said flange in said hole to selectively lock said hubcap to said wheel;

said hubcap includes a means for retarding removal of said nutcovers;

said means for retarding include a plurality of notches on said nutcovers, and a protrusion formed in said sidewalls of said holes, said protrusion adapted to engage said notches in such a manner as to require a greater force upon removal than upon attachment of said nutcovers in said holes;

said protrusion includes a first sloping side and a second sloping side, said second sloping said having a more severe slope than said first sloping side.

2. The system of claim 1, wherein said hubcap includes a means for dissipating heat formed in said sidewalls of said plurality of holes, proximate said flange.

3. The system of claim 2, wherein said means for dissipating heat is an opening, said nutcover adapted to be juxtapositioned with said opening, and allowing the passage of air therebetween while preventing the passage of debris.

4. The system of claim 1, wherein said hubcap further includes a removable center portion, said removable center portion allowing access to said hub of said wheel while said hubcap is attached to said wheel.

5. The system of claim 1, wherein said nutcover has sidewalls and a threaded interior portion;

said nutcover further includes a means for stabilizing the threaded interior portion;

said means for stabilizing comprises a plurality of supports, said plurality of supports substantially circumscribe said threaded interior portion.

6. The hubcap system of claim 5, wherein said supports each having a generally triangular shape and define a first side attached to said threaded interior portion, and a second side attached to said sidewalls of said nutcover.

* * * * *